Feb. 23, 1926.
L. K. VAUGHAN
ALMOND HULLER AND SHELLER
Filed Sept. 23, 1924
1,574,138
2 Sheets-Sheet 2
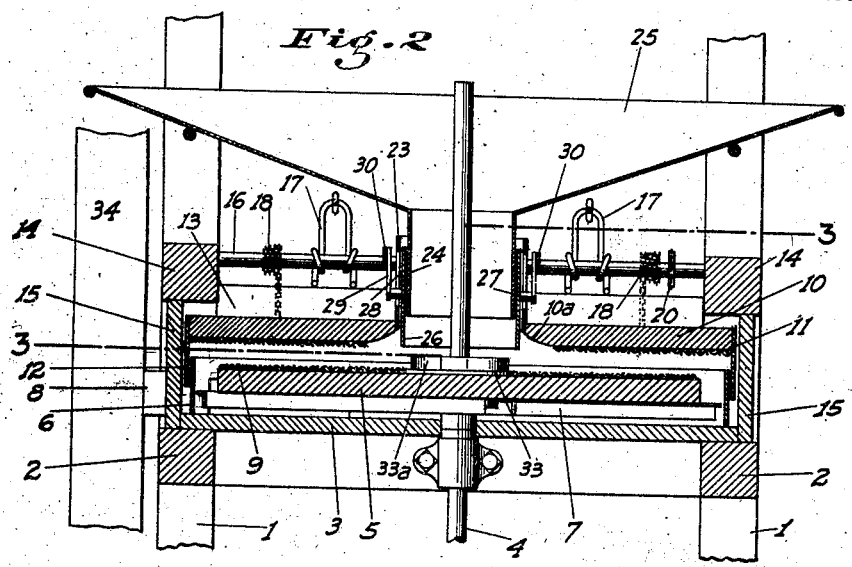
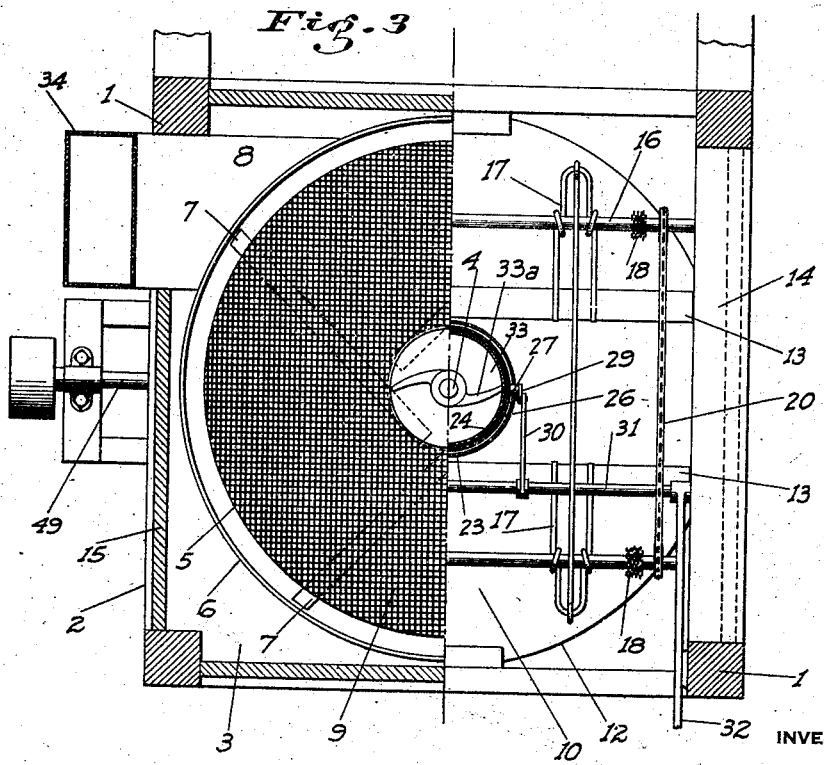
INVENTOR
Louis K. Vaughan
BY
ATTORNEY Patented Feb. 23, 1926.

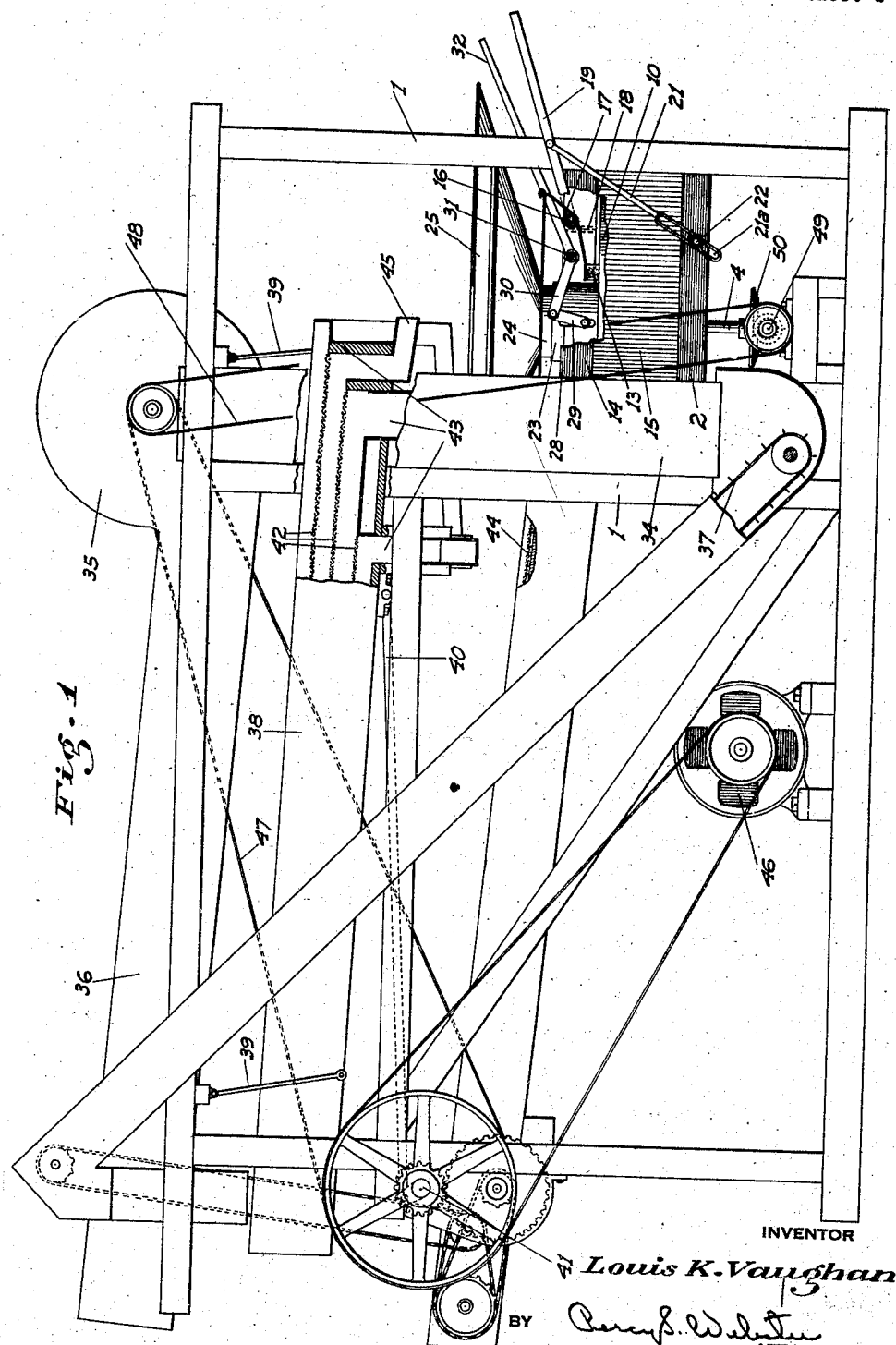

1,574,138

UNITED STATES PATENT OFFICE.

LOUIS K. VAUGHAN, OF WOODLAND, CALIFORNIA.

ALMOND HULLER AND SHELLER.

Application filed September 23, 1924. Serial No. 739,295.

*To all whom it may concern:*

Be it known that I, LOUIS K. VAUGHAN, a citizen of the United States, residing at Woodland, county of Yolo, State of California, have invented certain new and useful Improvements in Almond Hullers and Shellers; and I do declare the following to be a full, clear, and exact description of same, reference being had to the accompanying drawings, and to the characters of reference marked thereon, which form a part of this application.

This invention relates to improvements in machines especially intended for hulling almonds, or for shelling the same after they are hulled.

The principal object of my invention is to provide a machine for the purpose so that almonds of any and all sizes may be efficiently hulled, and with a subsequent operation the hulled nuts may be shelled without any substitution of different parts for the two operations being necessary. Suitable adjustment mechanism which I have provided, is all that is necessary to place the parts of the hulling or shelling mechanism in the proper relation to each other to handle the unhulled nuts, which are relatively large, or the hulled nuts to be shelled, which are of course smaller than the nuts with their hulls on.

Another object is to provide a simple form of adjustable feed control means, so that the output from the hulling or shelling mechanism may be regulated to suit, and regardless of the quantity of nuts which may be placed in the initial feed hopper. Therefore without interfering with the efficiency of the hulling or shelling operations, the rate of out-put may be regulated according to the number of pickers or other help available for handling the nuts after they leave the hulling and shelling mechanism.

A further object is to provide a means whereby the hulled or shelled nuts, with the matter removed therefrom, will be automatically and positively discharged from the structure after said nuts have been worked on, thereby preventing clogging up of the machine.

While I am using the machine at the present time for handling almonds, and I have shown and described the machine as designed for such purpose in the drawings and description hereafter set forth, the apparatus is admirably adapted to be used in handling not only nuts of any and all kinds, but also for hulling or thrashing corn, beans, and also for stemming raisins.

When using the device for the above named different purposes, few if any changes in construction would be necessary, and any such if made, would be of a minor nature which would not affect the principle of operation or main structure of the apparatus.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved huller and sheller, showing the same arranged in unitary conjunction with a separating mechanism and other features to handle the nuts after they have been hulled or shelled.

Fig. 2 is an enlarged transverse section of the hulling mechanism.

Fig. 3 is a cross section of the same, in two different planes, substantially on the line 3—3 of Fig. 2.

Referring now more particularly to the characters of reference on the drawings, the supporting structure for the hulling and shelling mechanism consists essentially of four rigid uprights 1, preferably arranged at the corners of a square area, and connected together at a suitable distance from the ground by transverse and longitudinal beams 2, which support a solid flooring 3.

A vertical shaft 4, driven in any suitable manner such as is hereinafter specified, is journaled in the frame structure and projects up through the floor for a certain distance, this shaft being centrally disposed between the four uprights. Fixed on this shaft above the floor and in spaced relation thereto is a solid circular disc 5, surrounded by an enlarged but concentric wall 6 mounted on the floor 3 and projecting a certain distance above the disc. The space between the disc and wall is sufficient to receive nuts or hulls of any size therebetween without danger of sticking.

Mounted on the under face of the disc and clearing the floor are more or less radial sweeping vanes or blades 7, whose outer ends just clear the wall 6. These blades are arranged relative to the shaft and to the direction of rotation thereof so that any matter dropping off the disc onto the floor will be swept by said vanes off said floor and through a side outlet chute 8 leading horizontally from the wall 6 and disposed substantially tangential thereto.

The upper face of the disc is covered throughout, except for a small area about and concentric with the shaft, by a sheet of rough or broken surfaced material 9. I have found very suitable for this purpose, net or matting made of heavy wire with a very close mesh.

Mounted above the disc 6 in spaced relation thereto is another rigid disc 10 having on its under face a surfacing 11 the same as the surfacing 9 on the under disc.

The disc 10 is somewhat larger than the disc 9, and extends to the plane of the wall 6. Another wall 12 is fixed about the rim of the upper disc, making a neat sliding fit with the wall 6.

The disc 10 is held from rotating by any suitable means, such for instance as transverse and spaced cleats 13 fixed thereon which slide between and are guided by horizontal beams 14 extending between the posts 1 above the beams 2. The space between said beams 2 and 14 is covered by boards 15 or the like, to protect the disc walls, which are preferably of light sheet metal, from possible damage from outside which would affect their proper freedom of relative movement.

The disc 10 is constantly but yieldably pressed toward the disc 5, but positively controlled and raised and lowered at will by the following structure: Mounted in and extending between the side beams 14 in horizontally spaced relation and parallel to said beams are turnable shafts 16 which serve as supports for transversely spaced sets of compression springs 17 of suitable form whose free ends bear down on the cleats 13. Chains or other flexible members 18 are fastened on and wrapped around the shafts and depend thence to connections with the disc 10. A hand control lever 19 is attached to one of the shafts, both shafts however being connected in driving relation by a chain drive 20 or the like. On manipulating said lever therefore, both shafts are rotated, causing the disc 10 to be raised or lowered, the extent of such movement being at the judgment of the operator and depending on the size of the nuts to be handled between the discs. To maintain the lever in any position to which it may be moved, I attach a slotted rod 21 thereto (see Fig. 1) which extends down to an adjacent beam 2, the slot 21$^a$ in the rod being engaged by an adjustable clamping screw 22 mounted in said beam.

The disc 10 is centrally orificed with a sleeve 23 projecting up from said orifice. Projecting into said sleeve in spaced relation thereto is the discharge spout 24 of a hopper 25 supported by uprights 1 at a suitable height. Slidably mounted between said sleeve and spout is a vertically adjustable sleeve 26 having opposed pins 27 thereon passing through vertical slots 28 in the sleeve 23. Links 29 extend between the pins 27 and arms 30 mounted on a shaft 31 to which is also connected a hand lever 32.

The under face of the disc 10 is made concave from its central orifice outwardly for a certain distance, as shown at 10$^a$, so that the distance between the discs around the orifice is greater than that between the actual hulling or rubbing surfaces of the discs.

The adjustable sleeve 26 being in the plane of said greater distance, it may be positioned so as to suitably regulate or restrict the vertical height of the opening leading to the rubbing surfaces of the discs, as may be found necessary to suit different sized nuts.

It will be noted that the adjustment of the sleeve is entirely independent of that of the discs themselves. The latter are adjusted to properly handle nuts of different sizes, while the sleeve is adjusted to control the rate of flow of nuts to the rubbing surfaces regardless of the size of the nuts. For instance, when hulling nuts which are obviously easy to hull and require but a light rubbing contact with the discs, the latter are widely separated. In that case, without the adjustable feed-control sleeve, the rate of flow of nuts to the rubbing surfaces and the consequent output, might be greater than the ability of the pickers and other operators to properly take care of.

Seated on the disc 5 concentric with the sleeve 26 is a smooth steel plate 33. This plate prevents grinding up of the almonds should the sleeve 26 be lowered to such an extent as to cut off the flow of nuts entirely for the time being and while the disc 5 is still turning.

If desired however I may fix on the shaft 4 immediately above said plate a small horizontal vane structure 33$^a$, arranged to throw nuts coming in contact therewith outwardly and past the sleeve. This device also acts to keep the nuts agitated and prevents them ever becoming jammed together.

The features heretofore described constitute my improved hulling and shelling mechanism, which can be made as a unitary machine to be used with any suitable form of separating or other handling means.

I prefer however to incorporate such separating and other means with the hulling and shelling mechanism to form a single unitary and portable machine, and I will now describe such additional features briefly.

The outlet 8 discharges into a vertical suction pipe 34 leading to a driven suction fan 35 mounted above the hulling structure, the discharge pipe 36 of said fan leading away from said structure. The pipe 34 opens at its lower end into the lower end of a driven conveyor 37 onto which the heavy matter (nuts and hulls) from the outlet 8 drop. This conveyor carries said matter upwardly and deposits it into a separating structure 38 suspended from flexible hangers 39 and reciprocated from a pitman 40 driven from a shaft 41. The separating structure has a downward slope from its end adjacent the conveyor 37 toward the hopper 25 and terminates above the latter.

Said structure includes a number of superimposed and spaced screens 42 of different mesh, as is common practice.

Certain of said screens have discharge chutes or spouts 43 thereunder at their lower ends, which convey the matter from the respective screens onto a combined refuse and hand-picking draper structure 44. One screen however (preferably the one under the uppermost one) has a discharge chute 45 leading to and discharging into the hopper 25. This is to enable unhulled nuts smaller than the average but too large to pass through the third screen, to be automatically returned to the huller for further treatment.

The purpose of the suction fan is to remove all light matter such as leaves, fluff etc. from the nuts before separation process, and since the suction pipe 34 communicates with the interior of the hulling chamber through the outlet 8, said chamber is kept clear of such light matter at all times, and which otherwise would inevitably collect therein and tend to ultimately choke up the nut rubbing surfaces of the discs.

Driving of the different members may be accomplished in various ways. In the present instance the shaft 41 is driven direct from a power plant 46 mounted on the machine, such plant being a gas engine, electric motor or the like. The fan 35 is driven from the shaft 41 by a belt 47, while the shaft 4 is driven from the fan by means of a belt 48 driving a shaft 49, the latter being connected in driving relation with the shaft 4 by gearing 50. The conveyor and drapers are also suitably driven from the shaft 41. It will be evident however that the driving arrangement can be varied as may be found desirable.

In operation the nuts to be treated are dumped into the hopper, the feed-control sleeve being adjusted to give the desired rate of feed of the nuts to the hulling surfaces. The vertically adjustable disc is also adjusted in its setting relative to the revolving disc to give the proper spacing for the size of nuts being worked on. The nuts, as they pass under the feed sleeve, work toward the rim of the discs owing to the action of centrifugal force caused by the revolving disc. As the nuts thus move outwardly, they are rubbed between the rough surfaces of the discs, causing the hulls to be removed from the nuts. The hulls and nuts drop off the under disc at the rim thereof and onto the floor, from which they are swept into the outlet 8 by the vanes 7 revolving with said disc 5.

If the nuts are already hulled and are to be shelled, the discs are set up closer, but otherwise no adjustments are necessary. In the case of hulling, the nuts themselves will never be mangled or otherwise damaged, and if they are being shelled, the meats will not be bruised or split, since the discs are held a definite distance apart, which distance is less than the thickness of the nut or meat, as the case may be.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A huller including vertically spaced discs between which the produce to be hulled passes, spring means acting to force the upper disc toward the lower one, flexible members under tension secured to said upper disc independent of the springs and resisting the action of the springs, and means for raising and lowering said members at will.

2. A huller including vertically spaced discs between which the produce to be hulled passes, spring means acting to force the upper disc toward the lower one, spaced shafts disposed in horizontal relation above the upper discs, means connecting said shafts to cause them to turn together at the same speed, turning means applied to one shaft, and flexible members wound at spaced intervals on the shafts and depending to the upper disc and connected to the latter.

3. A huller including vertically spaced discs between which the produce to be hulled passes, vertically adjustable means supporting the upper disc, a plurality of springs bearing down on the upper disc and arranged as a number of pairs, and equalizing means connecting the pairs.

4. A huller including vertically spaced discs between which the produce to be hulled passes, spaced shafts disposed in horizontal relation above the upper disc, flexible members depending from and wound on said shafts at spaced points to support the disc, springs mounted on the shafts and bearing down on the disc, and means for rotating the shafts.

5. A huller including vertically spaced discs between which the produce to be hulled passes, spaced shafts disposed in horizontal relation above the upper disc, flexible members depending from and wound on said shafts at spaced points to support the disc, flat spring means bearing on the discs and arranged as opposed pairs, eyes formed on the springs intermediate their ends and through which the shafts pass, the springs projecting thereabove, and connections between the upper ends of the springs of corresponding pairs.

In testimony whereof I affix my signature.

LOUIS K. VAUGHAN.